United States Patent
Sano et al.

(10) Patent No.: US 7,976,299 B2
(45) Date of Patent: Jul. 12, 2011

(54) BISECTED MOLD FOR TIRE MOLDING

(75) Inventors: Takuzou Sano, Hiratsuka (JP); Noboru Takada, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 389 days.

(21) Appl. No.: 12/161,480

(22) PCT Filed: Mar. 22, 2007

(86) PCT No.: PCT/JP2007/055923
§ 371 (c)(1),
(2), (4) Date: Jul. 18, 2008

(87) PCT Pub. No.: WO2007/108520
PCT Pub. Date: Sep. 27, 2007

(65) Prior Publication Data
US 2010/0219559 A1    Sep. 2, 2010

(30) Foreign Application Priority Data

Mar. 22, 2006 (JP) ................................ 2006-079212

(51) Int. Cl.
*B29C 35/02* (2006.01)
(52) U.S. Cl. .................................................. 425/46
(58) Field of Classification Search ............ 425/46, 425/47
See application file for complete search history.

(56) References Cited

U.S. PATENT DOCUMENTS

| | | | | |
|---|---|---|---|---|
| 3,778,203 A * | 12/1973 | MacMillan | ............. | 425/47 |
| 4,013,390 A * | 3/1977 | Moeller et al. | .......... | 425/46 |
| 5,676,980 A * | 10/1997 | Gulka et al. | ........... | 425/46 |
| 6,017,206 A * | 1/2000 | Soulalioux | ............. | 425/46 |
| 6,318,985 B1 * | 11/2001 | Heindel et al. | ......... | 425/46 |
| 6,632,393 B2 * | 10/2003 | Fike | .................... | 425/46 |

FOREIGN PATENT DOCUMENTS

| | | |
|---|---|---|
| JP | A 2000-127173 | 5/2000 |
| JP | A 2003-340835 | 12/2003 |
| JP | B2 3608161 | 1/2005 |

* cited by examiner

*Primary Examiner* — James Mackey
(74) *Attorney, Agent, or Firm* — Greer, Burns & Crain, Ltd (57) ABSTRACT

Provided are a bisected mold for tire molding that enables manufacturing of high-performance tires and that at a mold clamping, avoids a tire from being pinched to thereby attain a yield enhancement; and a process for manufacturing a tire. Inside a container bisected into upper and lower parts in the state of mold opening, there are disposed a mold for tire molding and, along upper and lower side plates, an unvulcanized tire. After performing vulcanization molding of the unvulcanized tire while changing from this state to a state of mold clamping of sectors and segments split into a plurality of pieces in a circumferential direction of the unvulcanized tire through a driving device and a slide unit means, only the sectors are subjected to mold opening by use of a driving means while maintaining the state of mold clamping of the mold for tire molding and the segments by the driving device and the slide unit means, and subsequently taking the vulcanization-molded tire.

4 Claims, 10 Drawing Sheets

BISECTED MOLD FOR TIRE MOLDING

This application is a U.S. National Phase under 35 U.S.C. §371, of International Application No. PCT/JP2007/055923, filed Mar. 22, 2007.

TECHNICAL FIELD

The present invention relates to a bisected mold for tire molding and a process for manufacturing a tire using the bisected mold for tire molding, and more specifically, to a bisected mold for tire molding capable of molding a high-performance tire while improving a defect at vulcanization molding and to a process for manufacturing a tire using this bisected mold for tire molding.

BACKGROUND ART

A bisected mold being vertically bisected along an equatorial plane of a tire and a sectional mold being split into multiple pieces in a circumferential direction of a tire, which pieces are expanded and contracted with respect to a center, have heretofore been known as molds used for vulcanization molding of an unvulcanized tire.

The bisected mold has an advantage of capabilities to simplify and reduce a size of mold equipment. On the contrary, in the case of a tire having a complicated tread pattern in recent years, problems may occur including: a large resistance at the time when a tire is separated from the mold; a manufacturing defect that the mold is opened with the tire being attached firmly to an inner surface of the mold; and a failure such as cracks.

Meanwhile, the sectional mold, which is split into multiple tread segment units in the circumferential direction of a tire, can deal with a complicated tread pattern. On the contrary, there is a problem of causing an increase in mold costs because it is necessary to provide a complicated sliding mechanism separately.

Accordingly, molds for vulcanization molding of a tire having a structure of a combination of a bisected mold and a sectional mold have been disclosed (see Patent Documents 1 and 2, for example).

Nevertheless, such a mold for vulcanization molding of a tire employs a structure in which multiple split segments are configured to expand and contract with respect to the center along with opening and closing actions of a top shell and a bottom shell obtained by vertically bisecting the mold. An elastic force of a spring is utilized for the mold's opening and closing operations of the segments. For this reason, there has been a problem of pinching an unvulcanized tire and causing a manufacturing defect of a tire because the segments' action of uniformly tightening the tire is not stabilized at the mold clamping in particular.

Patent Document 1: Japanese patent publication No. 3608161
Patent Document 2: Japanese patent application Kokai publication No. 2000-127173

DISCLOSURE OF THE INVENTION

Problem to be Solved by the Invention

The present invention is focused on the above-described problems of the background art and an object thereof is to provide a bisected mold for tire molding that enables manufacturing of high-performance tires by use of the bisected mold and that avoids the tire from being pinched at the mold clamping to reduce the chances of a defect at vulcanization molding and thereby to attain a yield enhancement, and to provide a process for manufacturing a tire using the bisected mold for tire molding.

Means for Solving the Problem

To attain the object, a bisected mold for tire molding of the present invention is a bisected mold for tire molding formed of containers, vertically bisected substantially in the center, that include sectors split into multiple pieces in a circumferential direction of a tire and segments slidably engaged with the sectors through inclined guiding means, in which driving means for causing the bisected containers to approach and recede from each other is provided on at least one of the bisected containers, an upper side plate and a lower side plate are detachably provided respectively on a vertical pair of sectors of the split containers, and molds for tire molding are detachably fitted to inner sides of the segments. Here, a guide pin penetrating the sector along the guiding means is buried in each of the vertical pair of segments of the bisected containers, and driving devices and slide unit means are provided on both tip ends of the guide pins protruding from an upper surface of the sector on an upper side of the vertical pair of sectors and from a lower surface of the sector on a lower side.

Here, the guiding means may be formed as a concave and convex engaging part having a circular conical surface shape. Meanwhile, it is also possible to provide uneven parts for positioning on both abutting surfaces of the vertical pair of sectors. Meanwhile, the slide unit means may be formed by providing slide plates configured to move up and down with a horizontal attitude through guide rods on the upper surface of the sector on the upper side of the vertical pair of sectors and on the lower surface of the sector on the lower side, providing slidable pin holders slidably connected to the tip ends of the guide pins protruding out of the slide plates, and providing lifting cylinders configured to move the slide plates up and down along the guide rods.

Meanwhile, a process for manufacturing a tire using a bisected mold for tire molding of the present invention includes the steps of placing an unvulcanized tire inside vertically bisected containers in a state of mold opening along a mold for tire molding, an upper side plate and a lower side plate, performing vulcanization molding of the unvulcanized tire while changing from this state to a state of mold clamping of sectors and segments split into multiple pieces in a circumferential direction of the unvulcanized tire through a driving device and a slide unit means, and at the time of mold opening of the containers after vulcanization molding of the unvulcanized tire, firstly mold-opening only the sectors by use of driving means while maintaining the state of mold clamping of the mold for tire molding and the segments by the driving device and the slide unit means and subsequently taking the vulcanization-molded tire from the inside of the mold for tire molding by mold-opening the mold for tire molding and the segments.

Here, an unvulcanized tire shaped by a shaping drum method or an unvulcanized tire shaped by a rigid core method can be used as the unvulcanized tire.

As described above, according to the present invention, it is possible to manufacture a high-performance tire by using a bisected mold. Moreover, it is also possible to reduce the chances of a defect at vulcanization molding while avoiding the tire from being pinched at mold clamping and thereby to attain a yield enhancement.

Effects of the Invention

By the configuration as described above, the present invention exerts excellent effects as follows:

(a) It is possible to perform vulcanization molding for manufacturing a high-performance tire using the bisected mold and to enhance uniformity of the tire;
(b) It is possible to reduce the chances of a defect at vulcanization molding by preventing the tire from being pinched at mold clamping, and thereby to enhance a yield;
(c) It is possible to avoid a lift from being applied to the tire and to perform vacuum vulcanization, thereby to manufacture a ventless tire with favorable external appearance;
(d) Since the mold hardly adheres to an inner surface of the tire, it is also possible to reduce the chances of a failure inside the tire; and
(e) It is possible to perform vulcanization molding on an unvulcanized tire shaped by a general shaping drum method or an unvulcanized tire shaped by a rigid core method.

EXPLANATION OF REFERENCE NUMERALS 1a, 1b CONTAINERS
2 DRIVING MEANS
4 DRIVING DEVICE
5 SLIDE UNIT MEANS
6 SLIDE UNIT DEVICE
7 SECTOR
7a ABUTTING SURFACE
8 GUIDING MEANS
8a GUIDE GROOVE
8b GUIDING PLATE
9 SEGMENT
10 UPPER SIDE PLATE
11 LOWER SIDE PLATE
12 MOLD FOR TIRE MOLDING
13 GUIDE PIN
14a, 14b UNEVEN PARTS
15 GUIDE ROD
16 SLIDE PLATE
17 PIN
18 PIN HOLDER
19 FRAME
20 BLADDER
21 BLADDER CENTER MECHANISM
21x CLAMP MECHANISM
26 CENTER POST

BEST MODES FOR CARRYING OUT THE INVENTION

Figure 1:
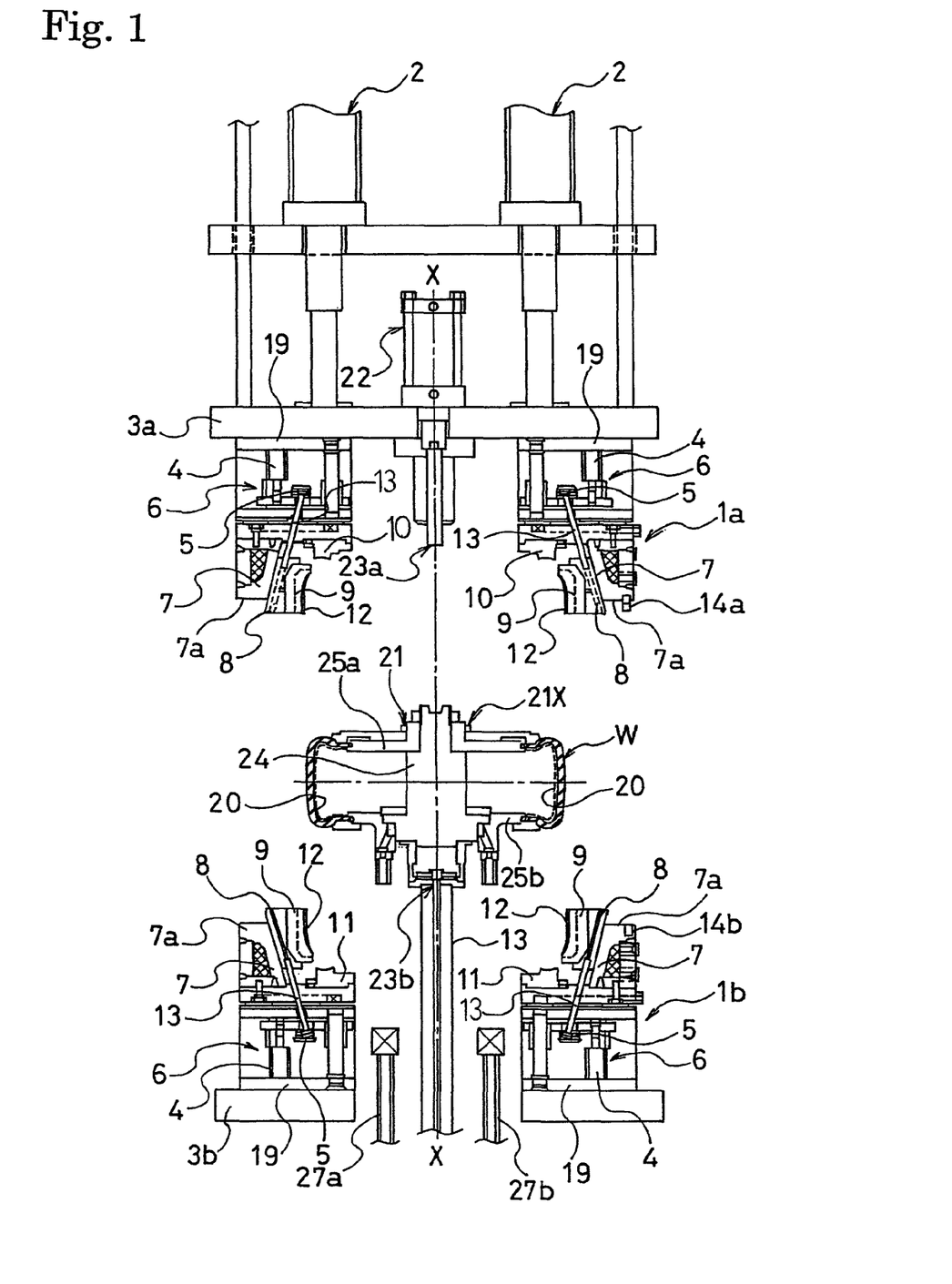
FIG. 1 is a schematic configuration diagram exemplifying a bisected mold for tire molding of the present invention in an opened state.
Figure 2:
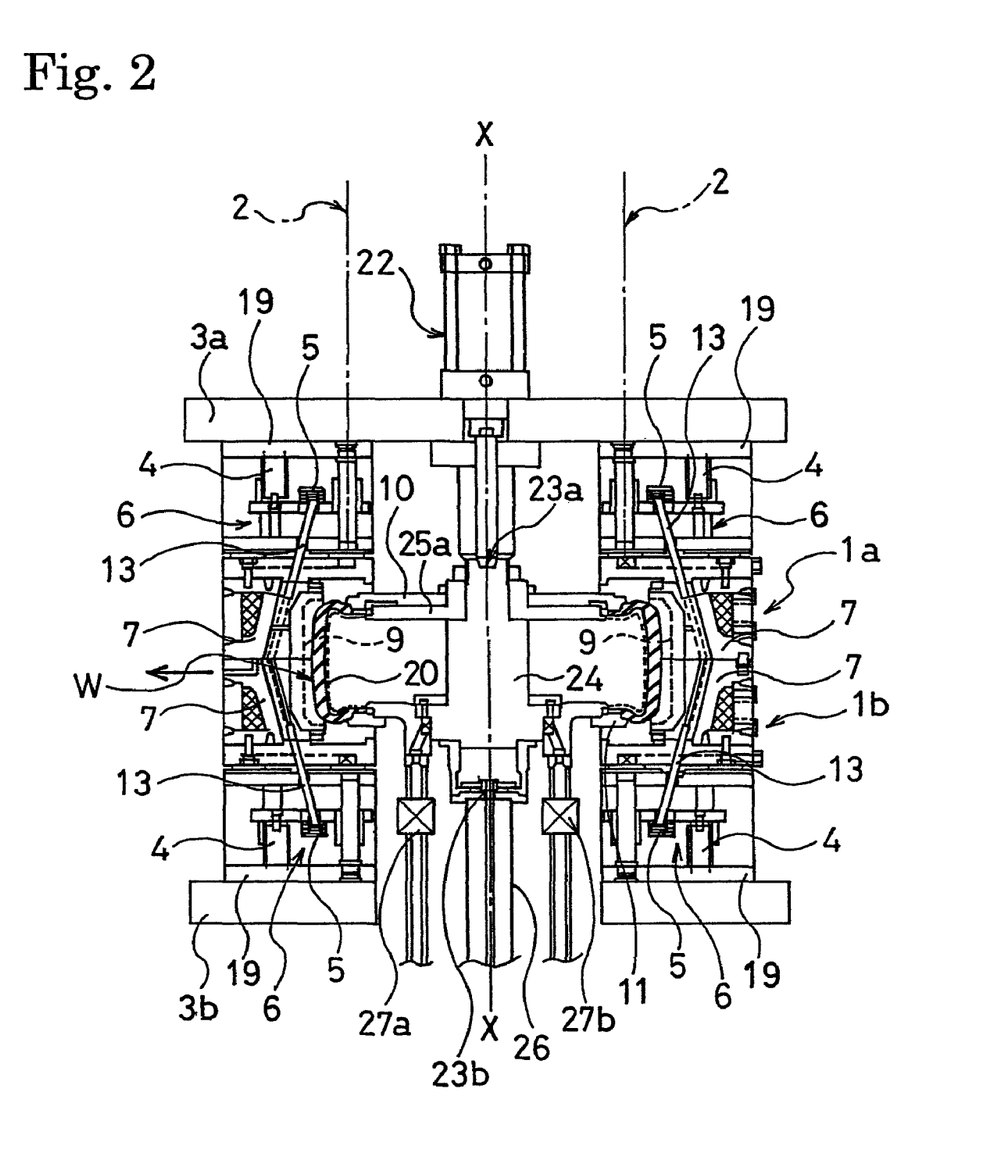
FIG. 2 is a schematic configuration diagram exemplifying the bisected mold for tire molding of the present invention in a closed state.

Hereinafter, an embodiment of this invention will be described with reference to the accompanying drawings.
FIG. 1 shows a schematic configuration diagram of a bisected mold for tire molding of the present invention in a state of mold opening, and FIG. 2 shows a schematic configuration diagram of the bisected mold for tire molding of the present invention in a closed state. This bisected mold for tire molding includes a pair of openable and closable containers 1a and 1b which are vertically split substantially at the center. At least one of the bisected containers 1a and 1b (the container 1a on an upper side in this embodiment) is provided with driving means 2 such as a hydraulic cylinder for causing the containers to approach and recede from each other.
Each of the containers 1a and 1b includes sectors 7 (see FIG. 3) split into multiple pieces in a circumferential direction of a tire through a slide unit device 6 formed by providing a driving device 4 such as a hydraulic cylinder and a slide unit means 5 on a base plate 3a or 3b, and segments 9 split into multiple pieces in the circumferential direction of the tire and engaged slidably with the sectors 7 through a guiding means 8 that has a circular truncated cone shape.
Meanwhile, an upper side plate 10 and a lower side plate 11 are detachably provided on a vertical pair of sectors 7, respectively. Molds 12 for tire molding are detachably fitted to the inside of a vertical pair of segments 9 split into the multiple pieces in the circumferential direction of the tire. In the vertical pair of containers 1a and 1b, when the sectors 7 move up and down where the vertical pair of segments 9 provided with the molds 12 for tire molding abut on each other in a vertically closed state, the segments 9 provided with the split molds 12 for tire molding performs expanding and contracting actions with respect to the center of the tire along the guiding means 8 formed of a concave and convex engaging part including a guide groove 8 having a circular truncated cone shape and a guiding plate 8b as shown in FIG. 1, FIG. 2, and FIG. 4. Here, it is also possible to form a surface of the guide groove 8a in the circular truncated cone shape into a flat surface instead of a curved surface. That is, it is also possible to form the guiding means 8 by using the engaging part having a flat surface shape.
A guide pin 13 penetrating the sector 7 along the inclined guiding means 8 is buried in each of the vertical pair of segments 9, and slide unit means 5 of the above-described slide unit devices 6 are provided on tip ends of the guide pins 13 protruding from an upper surface of the sector 7 on an upper side and from a lower surface of the sector 7 on a lower side. Moreover, engageable and detachable uneven parts 14a and 14b for positioning are provided on part of abutting surfaces 7a of the vertical pair of sectors 7.

In the slide unit means 5, as shown in FIG. 4, slide plates 16 configured to move up and down with a horizontal attitude through multiple guide rods 15 are provided on the upper surface of the sector 7 on the upper side and on the lower surface of the sector 7 on the lower side. A pin holder 18 which is swingably connected to the tip end of the guide pin 13 through a pin 17 is slidably placed on each of the slide plates 16. Meanwhile, the above-described driving device 4 such as a hydraulic cylinder for moving the slide plate 16 up and down along the guide rods 15 is vertically disposed on a frame 19 of each of the slide unit means 5.

Moreover, when the slide plate 16 is moved up and down along the guide rods 15 by expanding and contracting actions of the driving device 4, the pin holder 18 moves right and left on the slide plate 16, whereby the segment 9 connected by the guide pin 13 performs back and forth actions (expanding and contracting actions) horizontally in the direction with respect to the center of the tire along the guiding means 8.

A bladder center mechanism 21 for holding an unvulcanized tire W shaped by using a general shaping drum or an unvulcanized tire W shaped by using a rigid core is provided at a central portion in the planar direction of the openable and closable pair of containers 1a and 1b having the vertically bisected configuration. In this bladder center mechanism 21, an upper mold ejector 23a is disposed through a lifting cylinder 22, and a lower mold ejector 23b is disposed through an unillustrated lifting cylinder. Both of the ejectors 23a and 23b are disposed in a vertical direction on an X-X line being a central axis of upper and lower base plates 3a and 3b.

Here, reference numeral 20 in the drawing denotes a bladder and reference numeral 21x denotes a clamp mechanism for the unvulcanized tire W. This clamp mechanism 21x includes a center shaft 24 and upper and lower presser plates 25a and 25b. Reference numeral 26 in the drawing denotes a center post, and reference numerals 27a and 27b denote pipes for infusing a pressurized fluid (such as pressurized vapor) into the unvulcanized tire W.

Next, a vulcanization molding method for the tire W using the above-described bisected mold will be described with reference to a first step to a twelfth step shown in FIG. 5 to FIG. 16.

Figure 5:
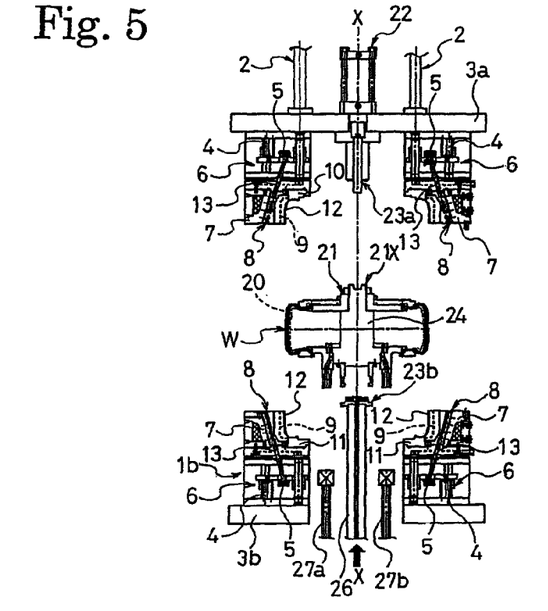
FIG. 5 is an explanatory view showing a first step of vulcanizing a tire by use of the bisected mold for tire molding of the present invention.
Figure 6:
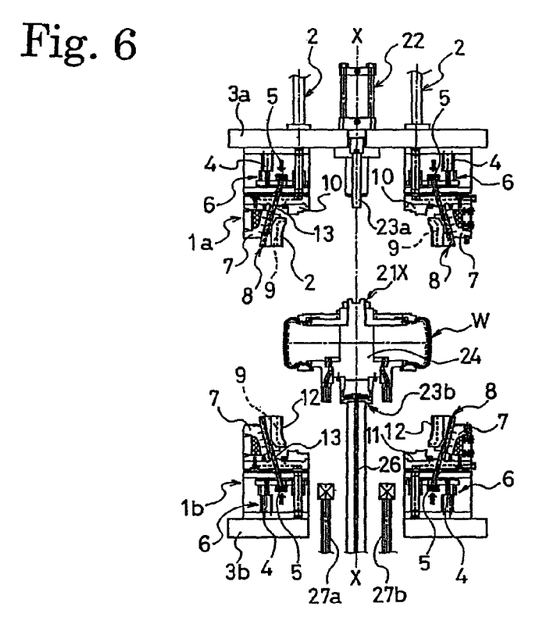
FIG. 6 is an explanatory view showing a second step after the first step shown in FIG. 5.

First, as shown in FIG. 5, the clamp 20 and the clamp mechanism 21x formed of the center shaft 24 and the upper and lower presser plates 25a and 25b are fitted to the inside of the unvulcanized tire W shaped by using a general shaping drum or the unvulcanized tire W (a green tire) taken out of a rigid core, which are conveyed to the central part of the pair of containers 1a and 1b. Subsequently, as shown in FIG. 6, the center post 26 is lifted up to allow clamping on the bladder center mechanism 21.

Figure 3:
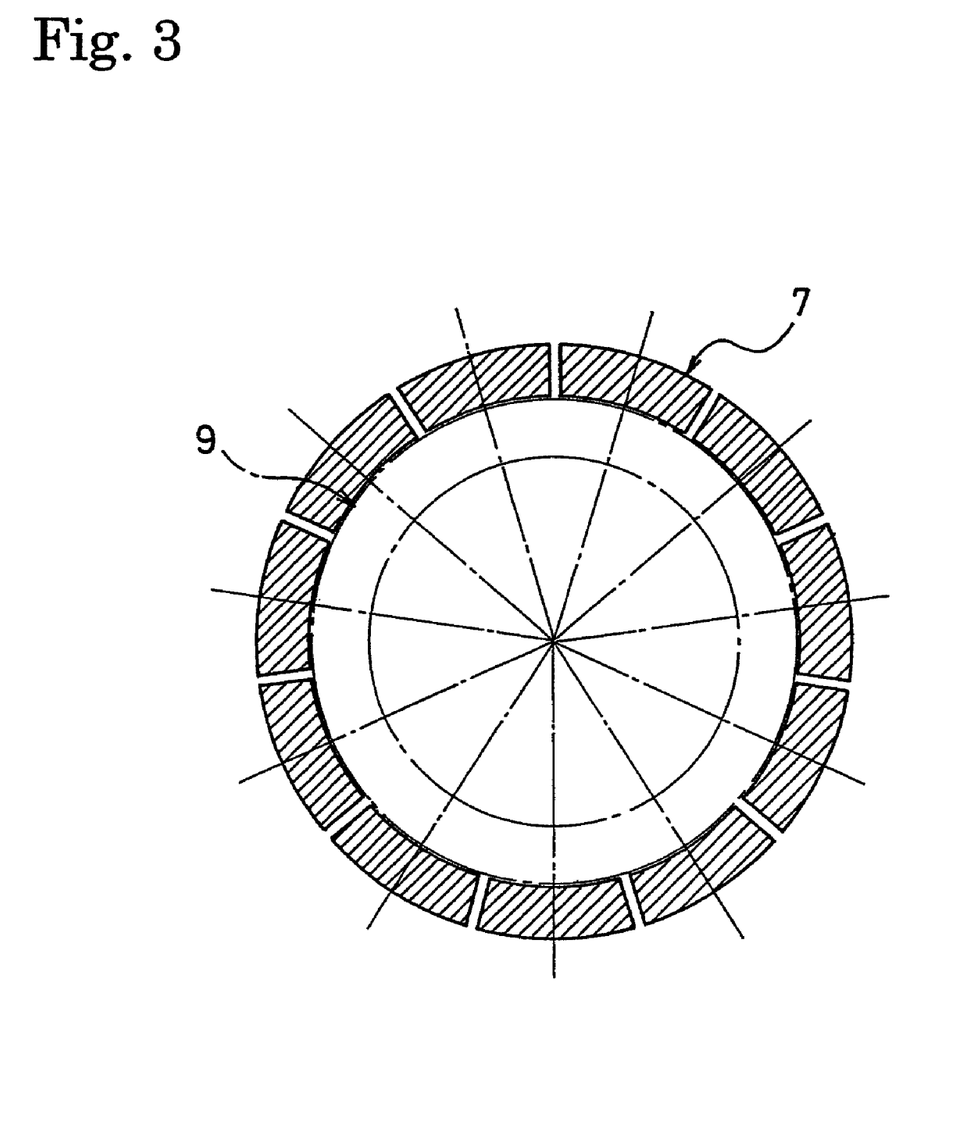
FIG. 3 is a plan view showing segments in a state of mold opening.
Figure 4:
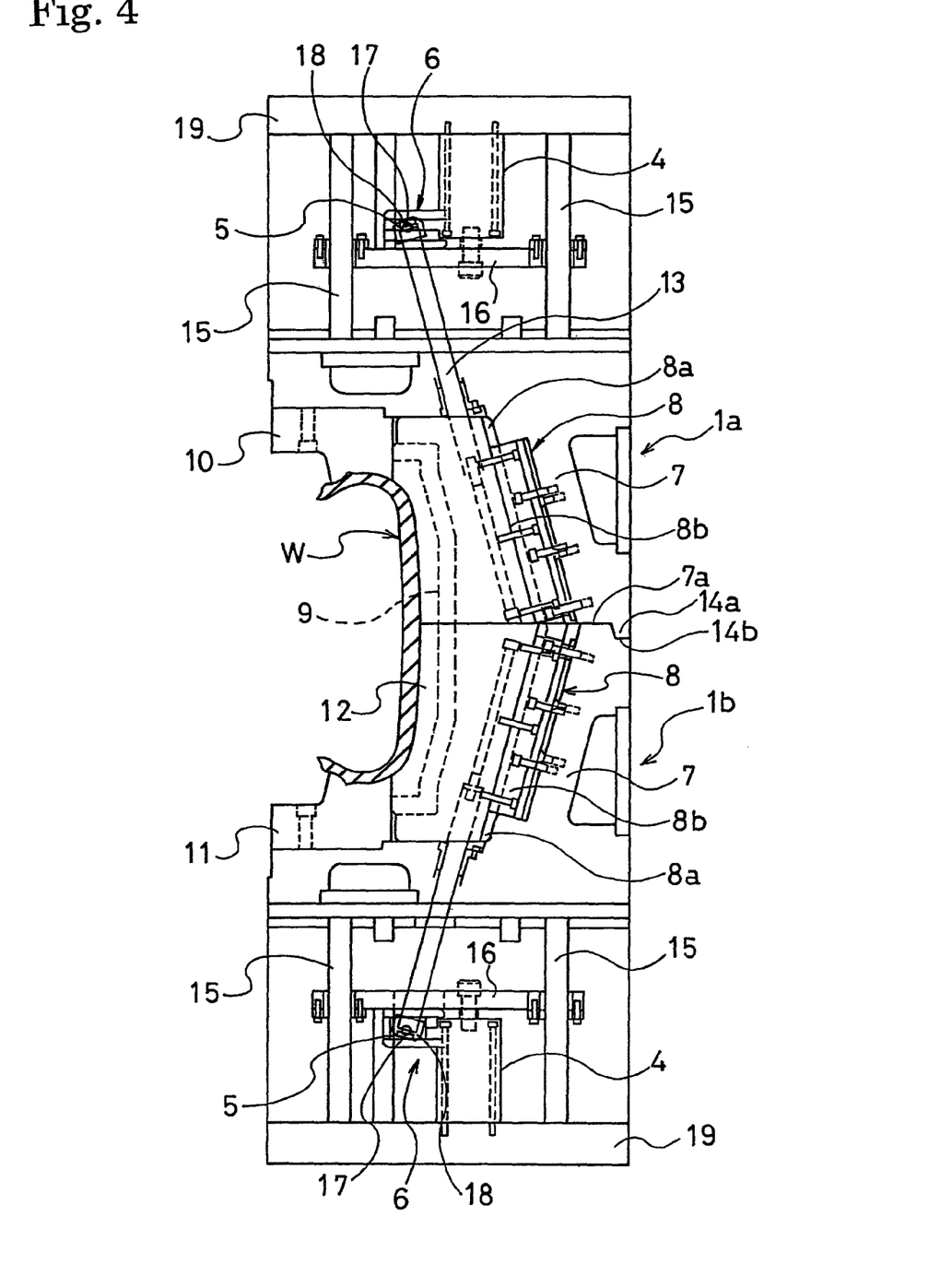
FIG. 4 is a partially enlarged front elevation of containers.
Figure 7:
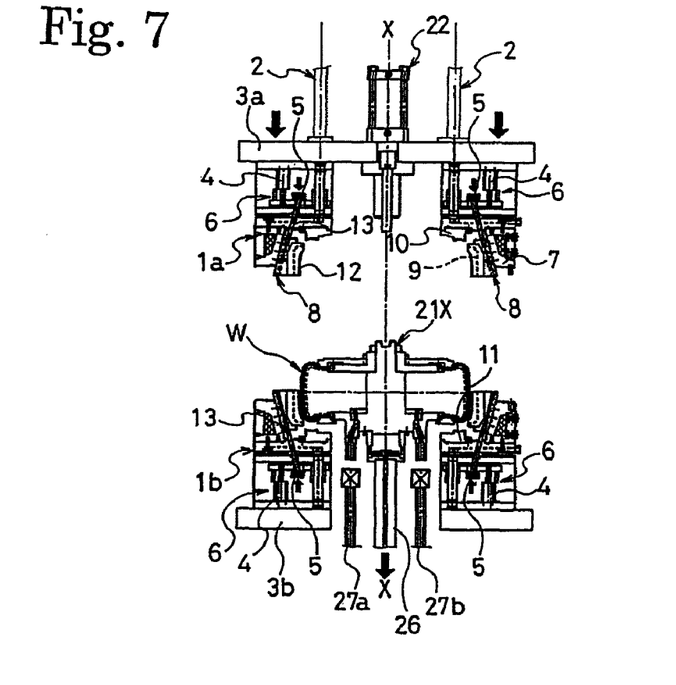
FIG. 7 is an explanatory view showing a third step after the second step shown in FIG. 6.

Subsequently, the upper mold ejector 23a is lifted down through the lifting cylinder 22 and the lower mold ejector 23b is lifted up through the unillustrated lifting cylinder, whereby the vertical pair of sectors 7 are set to an open state while providing clearances between mutually adjacent pieces in the circumferential direction of the tire as shown in FIG. 3. From this state, the unvulcanized tire W held by the clamp mechanism 21x is lifted down by lifting down the center post 26 as shown in FIG. 7. Meanwhile, the segments 9 slidably engaged with the sectors 7 are lifted down through the slide unit device 6 of the container 1a on the upper side, the sectors 7, and the guiding means 8 by use of the driving means 2.

Figure 8:
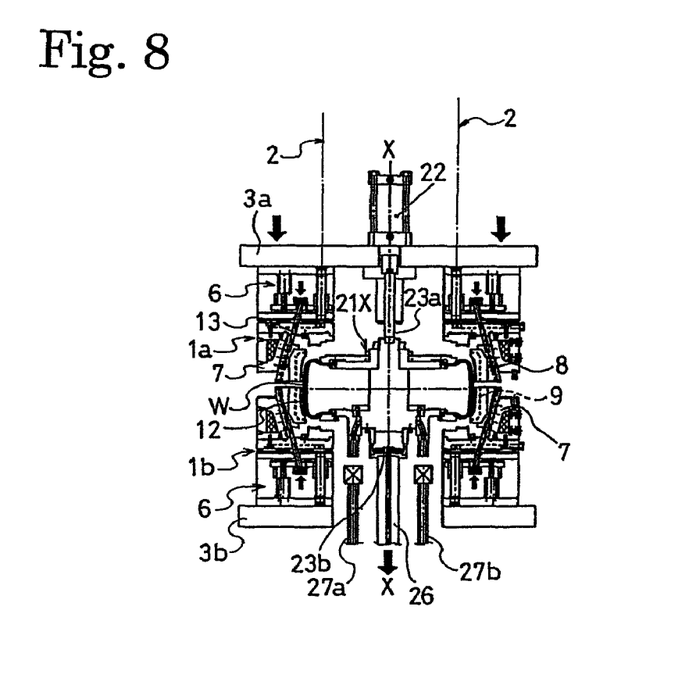
FIG. 8 is an explanatory view showing a fourth step after the third step shown in FIG. 7.
Figure 9:
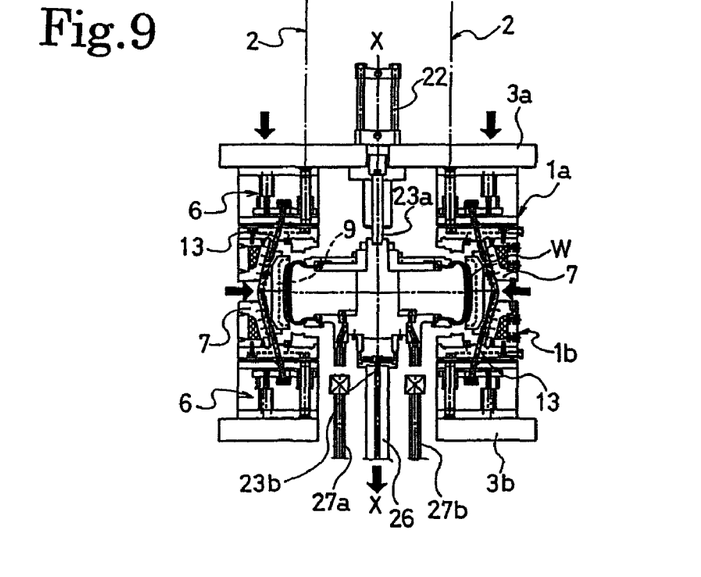
FIG. 9 is an explanatory view showing a fifth step after the fourth step shown in FIG. 8.
Figure 10:
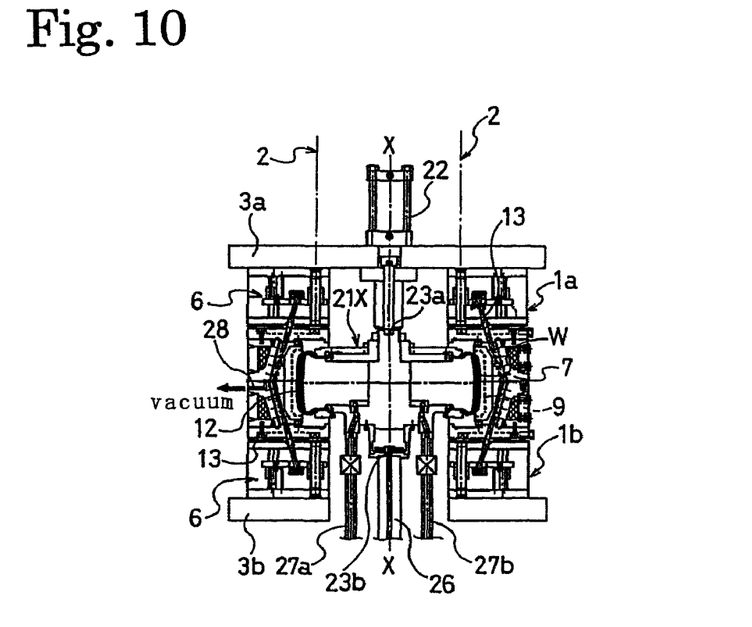
FIG. 10 is an explanatory view showing a sixth step after the fifth step shown in FIG. 9.

Subsequently, as shown in FIG. 8, the slide unit device 6 of the container 1a, the sectors 7, and the segments 9 are lifted down while lifting down the center post 26 that holds the unvulcanized tire W, thereby starting mold clamping of the sectors 7 and the segments 9. Moreover, when mold clamping is performed by the container 1a and the container 1b, the segments 9 that are engaged with the sectors 7 through the guide pins 13 and the guiding means 8 move horizontally toward the center of the tire in the radial direction as reducing their diameter as shown in FIG. 9. By allowing the segments 9 to move horizontally toward the center of the tire in the radial direction as reducing their diameter for mold clamping after the vertical pair of segments 9 and the molds 12 for tire molding abut on each other respectively to establish the vertically closed state, it is possible to prevent a defect where the unvulcanized tire W is pinched by the split molds 12 for tire molding. When the center post 26 is further lifted down and a side portion of the unvulcanized tire W abuts on the lower side plate 11, the pipes 27a and 27b abut on the bladder center mechanism 21 and are clamp-connected.

Simultaneously with completion of mold clamping as described above, the inside of the molds 12 for tire molding that subject the unvulcanized tire W to mold clamping is evacuated by an unillustrated vacuum means (vacuum suction means) connected to vacuum passages 28 formed on the segments 9. At the same time, the pressurized fluid (such as the pressurized vapor) is introduced from the pipes 27a and 27 into the unvulcanized tire W (see FIG. 10).

Figure 11:
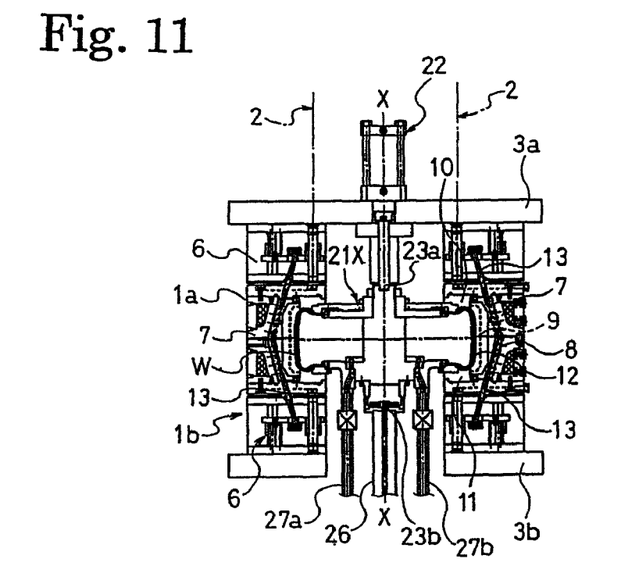
FIG. 11 is an explanatory view showing a seventh step after the sixth step shown in FIG. 10.
Figure 12:
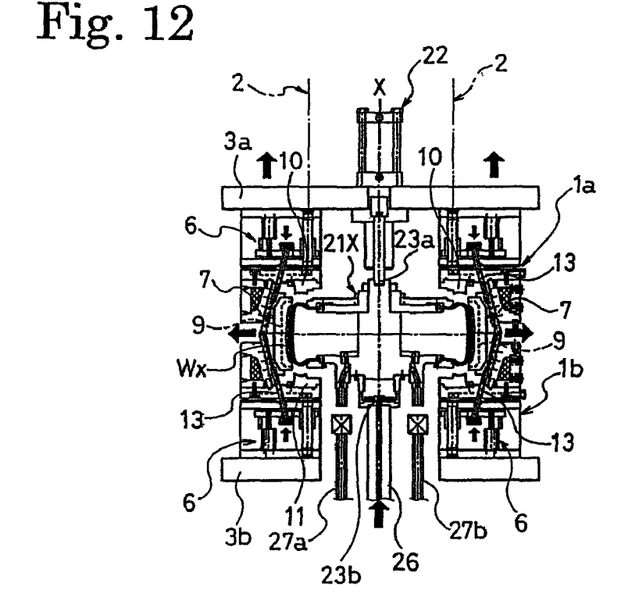
FIG. 12 is an explanatory view showing an eighth step after the seventh step shown in FIG. 11.

Then, a mold detaching process is started after subjecting the unvulcanized tire W to vulcanization molding for a predetermined time period as shown in FIG. 11. In this mold detaching process, as shown in FIG. 12, clamping of the pipes 27a and 27b connected to the bladder center mechanism 21 is released and the slide unit device 6 and the sectors 7 of the container 1a on the upper side are lifted up by using the driving means 2. At the same time, by causing the lifting cylinder 22 to perform an extending action, the upper mold ejector 23a is lifted down, thereby establishing a state engaged with the clamp mechanism 21x.

When the sectors 7 are lifted up, the segments 9 engaged through the guiding means 8 are also apt to be detached from the vulcanization-molded tire Wx. However, since the slide plate 16 is pushed down along the guide rods 15 by causing the driving device 4 of the slid unit device 6 to perform an extending action, the segments 9 burying the guide pins 13 do not move outward in the radial direction away from the center of the tire immediately. In lifting down of this slide plate 16, the guide pin 13 moves as the pin holder 18 slides on the slide plate 16. Along with this motion of the guide pin 13, the segment 9 provided with the mold 12 for tire molding gradually moves outward in the radial direction away from the center of the tire and is detached from the surface of the vulcanization-molded tire Wx.

Figure 13:
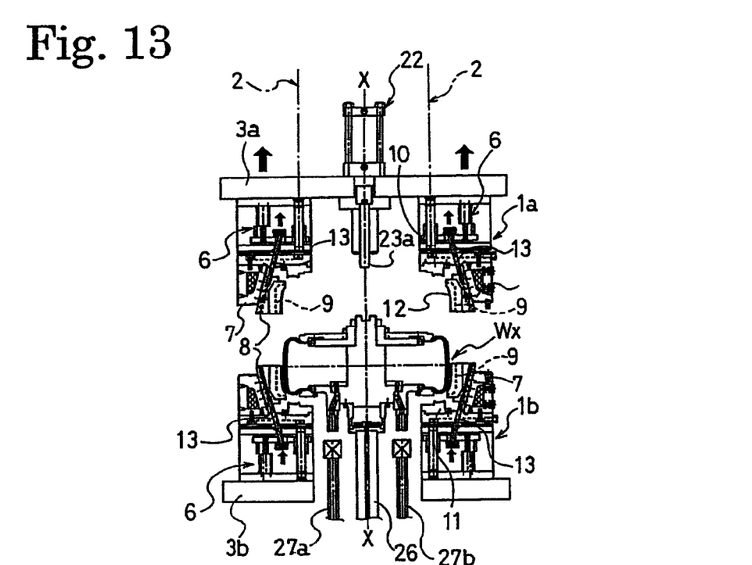
FIG. 13 is an explanatory view showing a ninth step after the eighth step shown in FIG. 12.
Figure 14:
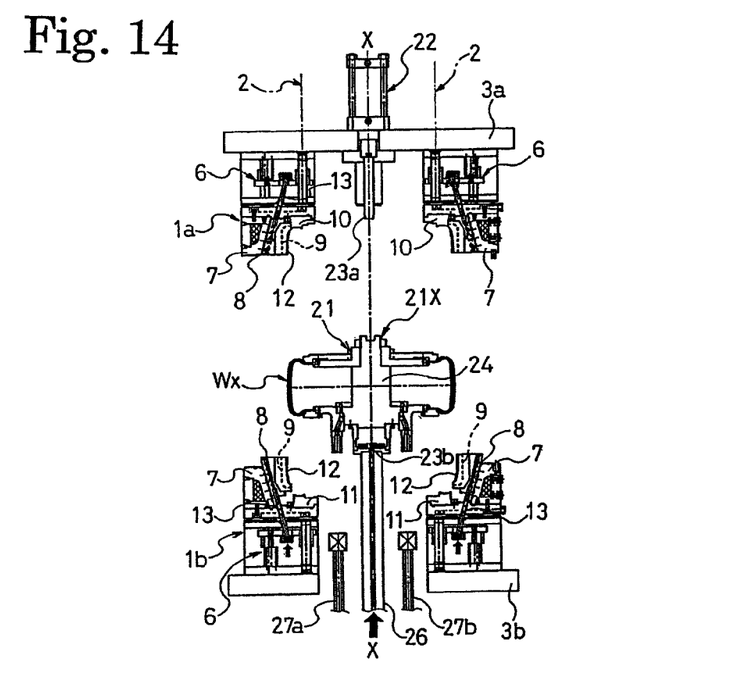
FIG. 14 is an explanatory view showing a tenth step after the ninth step shown in FIG. 13.

Then, as shown in FIG. 13, the container 1a on the upper side is lifted up by the driving means 2 and is completely detached from the surface of the tire Wx. Thereafter, the segments 9 and the molds 12 for tire molding on the upper side are housed in the container 1a on the upper side. Subsequently, the center post 26 is caused to perform an extending action while retaining an inner pressure of the tire Wx, thereby lifting the tire Wx up to a tire extracting position (see FIG. 14).

Figure 15:
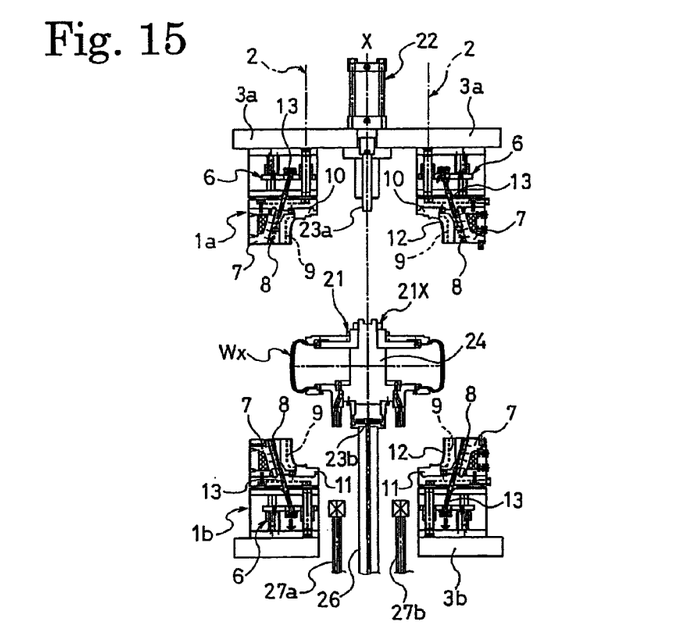
FIG. 15 is an explanatory view showing an eleventh step after the tenth step shown in FIG. 14.
Figure 16:
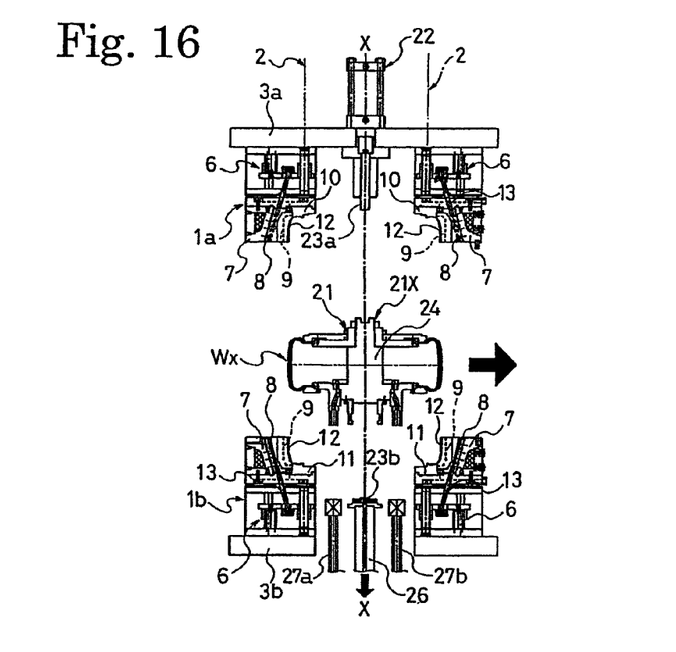
FIG. 16 is an explanatory view showing a twelfth step after the eleventh step shown in FIG. 15.

From this state, as shown in FIG. 15, the lower mold ejector 23b is lifted down, and moreover, the segments 9 and the molds 12 for tire molding on the lower side are housed in the container 1b on the lower side. Thereafter, as shown in FIG. 16, the center post 26 is released from the clamp mechanism 21x that holds the tire Wx, and the operation is completed by taking the vulcanized tire Wx out of the containers 1a and 1b and conveying the tire Wx to a subsequent process.

As described above, in this embodiment, the unvulcanized tire W is disposed inside the bisected containers 1a and 1b in the state of mold opening and along the molds 12 for tire molding, the upper side plate 10, and the lower side plate 11. From this state, vulcanization molding of the tire W is performed in the state of mold clamping of the sectors 9 and the segments 7 in the containers 1a and 1b by using the driving device 2 and the slid unit means 5. The sectors 9 and the segments 7 are split into multiple pieces in the circumferential direction of the tire. After vulcanization molding of the tire and at the time of starting mold opening of the containers 1a and 1b, only the sectors 7 are firstly subjected to mold opening by use of the driving means 2 while maintaining the molds 12 for tire molding and the segments 9 in the state of mold clamping by use of the driving device 4 and the slide unit means 5. Subsequently, the segments 9 and the molds 12 for tire molding are subjected to mold opening and then the molded tire Wx is taken out of the inside of the molds 12 for tire molding. Accordingly, it is possible to perform vulcanization molding of the high-performance tire W by use of the bisected mold and to enhance uniformity of the tire W.

Moreover, it is possible to reduce the chances of a defect at vulcanization molding by preventing the tire W from being pinched at mold clamping of the molds 12 for tire molding, and thereby to enhance a yield. Furthermore, it is possible to avoid a lift being applied to the tire W and to perform vacuum vulcanization, thereby to manufacture a ventless tire with favorable external appearance. In addition, since the molds 12 for tire molding hardly adhere to the inner surface of the tire, it is also possible to reduce the chances of a failure inside the tire.

What is claimed is:

1. A bisected mold for tire molding formed of:
   upper and lower containers centrally separated along a horizontal plane, each of said upper and lower containers being split into a plurality of sectors arranged, in a circumferential direction of a tire, and a plurality of segments with each segment slidably engaged with a sector through inclined guiding means;
   a driving means for causing the upper and lower containers to approach and recede from each other, the driving means being provided on at least one of the containers;
   one or more upper side plates and one or more lower side plates detachably provided respectively on the upper and lower containers;
   molds for tire molding detachably fitted to inner sides of the segments;
   a plurality of guide pins, wherein one or more guide pins penetrates each sector along the guiding means and wherein one end of each guide pin is fixedly attached to each segment;
   a plurality of driving devices for causing each guide pin to move up and down; and
   slide unit means for slidably attaching each guide pin to one of said driving devices.

2. The bisected mold for tire molding according to claim 1, wherein the guiding means is formed as a concave and convex engaging part having a circular conical surface shape.

3. The bisected mold for tire molding according to claim 1, wherein uneven parts for positioning are provided on abutting surfaces of the upper and lower containers such that the uneven parts interact to guide the position of the containers when closing.

4. The bisected mold for tire molding according to claim 1, wherein the slide unit means include:
   slide plates configured to move up and down in a horizontal attitude through guide rods, and provided on an upper surface of each sector on the upper container and on a lower surface of each sector on the lower container;
   slidable pin holders slidably connected to tip ends of the guide pins protruding out of the slide plates; and lifting cylinders configured to move the slide plates up and down along the guide rods.

* * * * *